United States Patent
Ishida et al.

(10) Patent No.: US 9,426,318 B2
(45) Date of Patent: Aug. 23, 2016

(54) IMAGE READER UNIT AND IMAGE FORMING APPARATUS INCLUDING SAME

(71) Applicants: Masatoshi Ishida, Kanagawa (JP); Tadaaki Oyama, Kanagawa (JP)

(72) Inventors: Masatoshi Ishida, Kanagawa (JP); Tadaaki Oyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/633,464

(22) Filed: Feb. 27, 2015

(65) Prior Publication Data

US 2015/0249762 A1 Sep. 3, 2015

(30) Foreign Application Priority Data

Mar. 3, 2014 (JP) .................. 2014-040199

(51) Int. Cl.
*H04N 1/04* (2006.01)
*H04N 1/00* (2006.01)
*H04N 1/10* (2006.01)

(52) U.S. Cl.
CPC ....... *H04N 1/00713* (2013.01); *H04N 1/00737* (2013.01); *H04N 1/00755* (2013.01); *H04N 1/1043* (2013.01); *H04N 1/1061* (2013.01); *H04N 2201/0081* (2013.01)

(58) Field of Classification Search
CPC .......... H04N 1/00713; H04N 1/00737; H04N 1/00755; H04N 1/1043; H04N 1/1061
USPC .......................... 358/475, 488, 497, 509, 505
See application file for complete search history.

(56) References Cited

U.S. PATENT DOCUMENTS

| | | | | |
|---|---|---|---|---|
| 7,209,702 B2* | 4/2007 | Kohchi | .................. | G03B 27/62 358/448 |
| 7,558,524 B2* | 7/2009 | Ooshima | ............ | H04N 1/00681 358/449 |
| 7,804,627 B2* | 9/2010 | Horiguchi | .......... | H04N 1/00681 358/474 |
| 2005/0129436 A1 | 6/2005 | Kohchi et al. | | |
| 2014/0192386 A1 | 7/2014 | Ishida | | |

FOREIGN PATENT DOCUMENTS

| | | |
|---|---|---|
| JP | 2005-156638 | 6/2005 |
| JP | 2005-354205 | 12/2005 |
| JP | 2010-273098 | 12/2010 |
| JP | 2010-273099 | 12/2010 |
| JP | 2013-126176 | 6/2013 |

* cited by examiner

*Primary Examiner* — Cheukfan Lee
(74) *Attorney, Agent, or Firm* — Harness, Dickey & Pierce, PLC

(57) ABSTRACT

An image reader unit includes a platen on which to place a document; a light source including a plurality of split light sources to emit light beams toward a surface of the document; a movable exposure unit moving in a sub-scanning direction while obtaining reflected light reflected from the surface of the document; an image sensor to scan an image of the document by receiving the reflected light; and a reader processor to identify a length of the document in the main scanning direction based on a received light quantity from the image sensor obtained by activating fewer than all of the plurality of split light sources necessary for identifying the length of the document in the main scanning direction while moving the movable exposure unit in the sub-scanning direction.

18 Claims, 11 Drawing Sheets

IMAGE READER UNIT AND IMAGE FORMING APPARATUS INCLUDING SAME

CROSS-REFERENCE TO RELATED APPLICATION

The present application claims priority pursuant to 35 U.S.C. §119(a) from Japanese patent application number 2014-040199, filed on Mar. 3, 2014, the entire disclosure of which is incorporated by reference herein.

BACKGROUND

1. Technical Field

Exemplary embodiments of the present invention relate to an image reader unit and an image forming apparatus including the image reader unit.

2. Background Art

Conventionally, a document or image reader unit as described below is known. The image reader unit includes a platen cover openably closable relative to a platen, and an optical mount including an LED array that includes a plurality of LED elements disposed in a main scanning direction along a surface of the document platen. The optical mount is movable along a surface of the platen in a sub-scanning direction perpendicular to the main scanning direction so as to optically scan an image on a document placed on the platen. The platen cover is closed by a user or operator relative to the platen, so that the document on the platen is pressed against the platen. In this state, the image reader unit, upon receipt of a reading start command from the user, causes the optical mount as a movable light emitter to radiate light beams from the plurality of LED elements toward a surface of the document, while receiving reflected light from the surface of the document, and to move in the sub-scanning direction. The image reader unit causes a charge-coupled device (CCD) used as an image sensor to receive the reflected light and scan the image of the document.

A processor of the image reader unit, before reading out the image of the document, performs processes to identify the length of the document in the main scanning direction. For this length identifying process, the image reader unit includes a sensor disposed near the platen cover to detect opening and closing of the platen cover. When the platen cover is opened to place a document on the platen, the sensor detects its opening operation. The processor of the image reader unit moves the optical mount from a predetermined standby position to a document size detection position opposed to a leading end of the document in the sub-scanning direction, upon the opening operation of the platen cover is detected. Thereafter, when the sensor detects a closing operation of the platen cover, the processor causes to perform the following length identifying process.

Specifically, among the plurality of LED elements included in the LED array, some of the LED elements necessary for identifying a length of the document in the main scanning direction alone is lit, and the reflected light obtained by the lighting is received by the CCD. Then, whether or not the document exists at a position opposed to each lit LED element is determined based on the received light quantity of an area opposed to each LED element in the light receiving area of the CCD in the main scanning direction, and the length of the document in the main scanning direction is identified based on the above determination result.

SUMMARY

In one embodiment of the disclosure, there is provided an optimal image reader unit including: a platen on which to place a document; a light source including a plurality of split light sources aligned in a main scanning direction along a surface of the platen, the plurality of split light sources emitting light beams toward a surface of the document on the platen; a movable exposure unit moving in a sub-scanning direction perpendicular to the main scanning direction while obtaining reflected light reflected from the surface of the document; an image sensor to scan an image of the document by receiving the reflected light; and a reader processor to identify a length of the document in the main scanning direction based on a received light quantity from the image sensor obtained by activating fewer than all of the plurality of split light sources. The reader processor is configured to: perform a lighting and light-receiving process to light simultaneously or at a periodic interval only split light sources necessary for identifying the length of the document in the main scanning direction among all the plurality of split light sources while moving the movable exposure unit in the sub-scanning direction and obtain a received light quantity of the image sensor as to each of the split light sources lit; and identify the length of the document based on the received light quantity.

In another embodiment of the disclosure, there is provided an image forming apparatus that includes an image reader unit to scan an image of a document as described above; and an image forming unit to form an image on a recording member based on the read-out results of the image obtained by the image reader unit.

These and other objects, features, and advantages of the present invention will become apparent upon consideration of the following description of the preferred embodiments of the present invention when taken in conjunction with the accompanying drawings.

DETAILED DESCRIPTION

Hereinafter, exemplary embodiments according to the present invention are applied to a copier 100 employing an electrophotographic method will be described.

Figure 1:
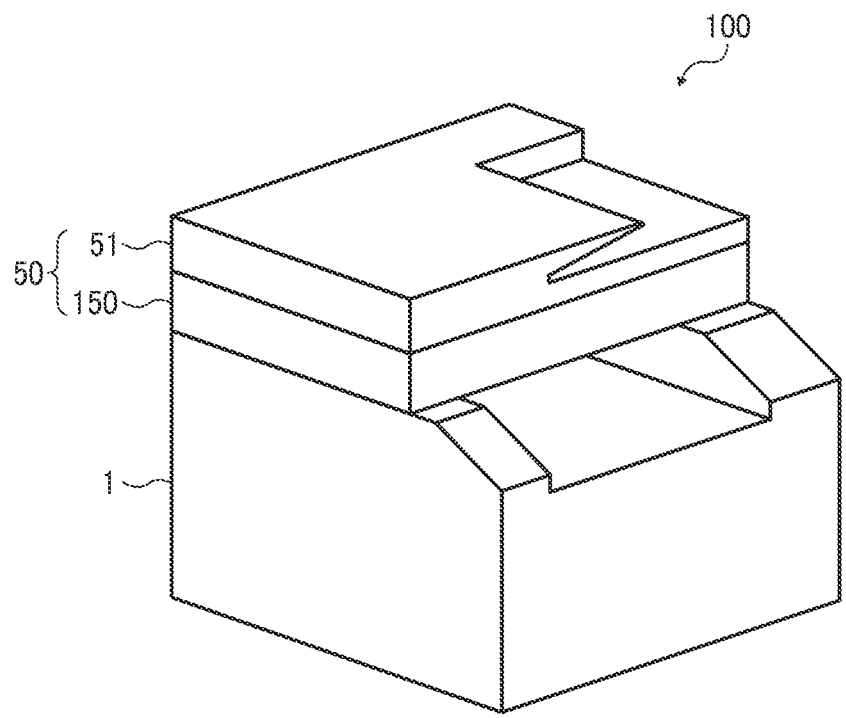
FIG. 1 is a perspective view of a copier according to an embodiment of the present invention.

First, a basic structure of the copier 100 will be described. FIG. 1 is a perspective view of the copier according to an exemplary embodiment of the present invention. The copier 100 includes an image forming unit 1 as an image forming means, a sheet feed device 40, and an image reader unit 50. The image reader unit 50 includes a scanner 150 as an image reading device secured on the image forming unit 1, and an automatic document feeder (ADF) 51, supported by the scanner 150.

Figure 2:
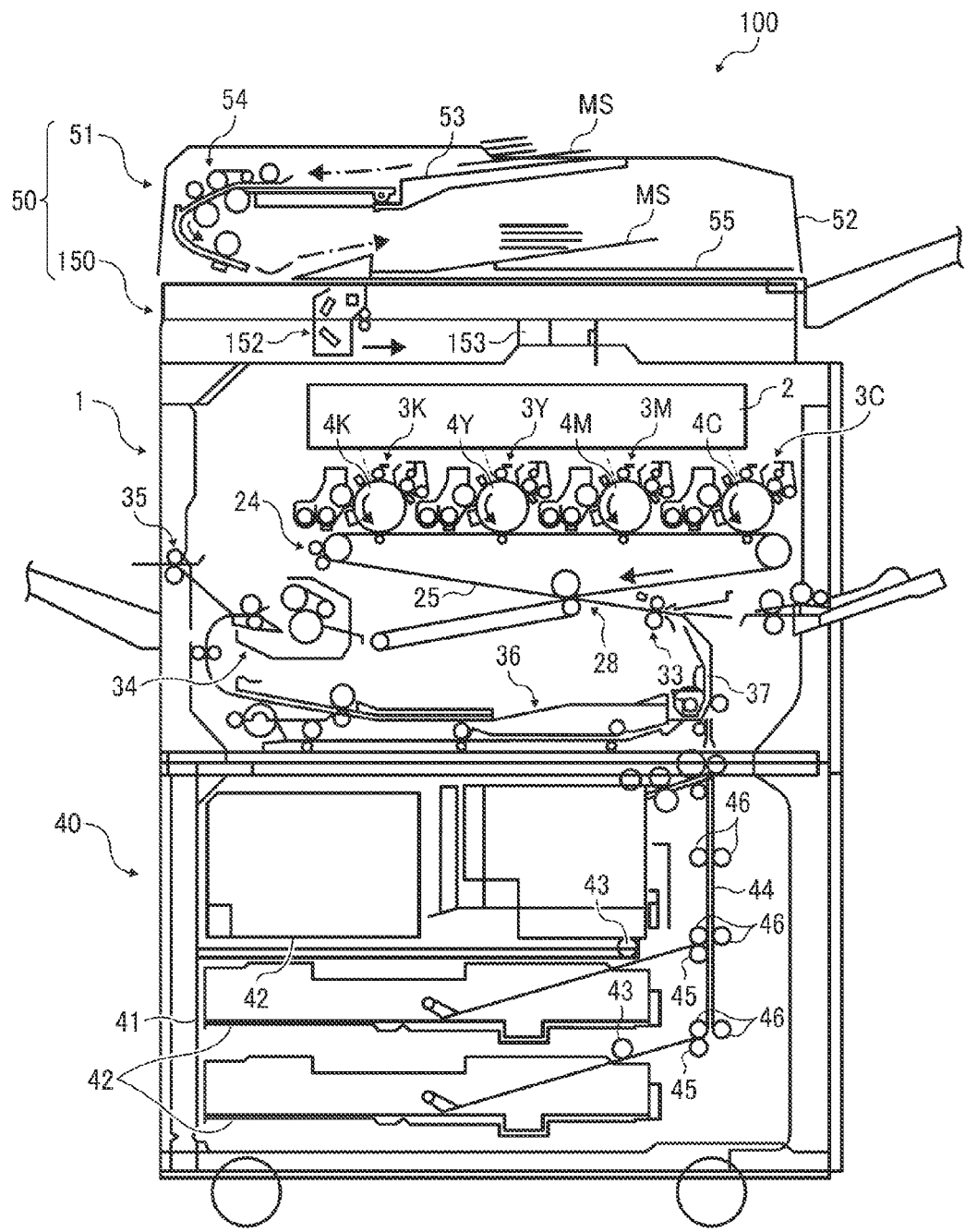
FIG. 2 is a general configuration of the copier according to one embodiment of the present invention.

FIG. 2 is a general configuration of the copier 100 according to one embodiment of the present invention. As illustrated in FIG. 2, the sheet feed device 40 of the image forming unit 1 includes two paper trays 42 disposed in stories in a paper bank 41, feed rollers 43 to feed a recording sheet from the paper trays, and separation rollers 45 to separate the fed recording sheet one by one. In addition, the sheet feed device 40 includes a plurality of conveyance roller pairs 46 to convey the recording sheet to a sheet conveyance path 37 of the image forming unit 1.

The paper trays 42 each store recording sheets S as a sheet bundle in which a plurality of recording sheets is stacked. The feed rollers 43 are pressed to a topmost sheet of the sheet bundle. When the feed roller 43 rotates in this state, the topmost sheet of the sheet bundle is sent out from the paper tray 42.

Around the paper trays 42, a first conveyance roller of the conveyance roller pair 46 and a second conveyance roller disposed right in FIG. 2 contact each other, thereby forming a conveyance nip. The separation roller 45 is disposed below the first conveyance roller, so that the separation roller 45 and the first conveyance roller contact each other to thereby form a separation conveyance nip.

When the feed roller 43 rotates, the recording sheet fed out from the paper tray 42 enters into the separation conveyance nip formed between the first conveyance roller of the conveyance roller pairs 46 and the separation roller 45 disposed below the first conveyance roller. In this separation conveyance nip, the first conveyance roller contacting the upper surface of the recording sheet while rotating counterclockwise in FIG. 2 applies to the recording sheet a conveyance force directed to a conveyance path 44 from the paper tray 42. By contrast, the separation roller 45 that contacts a bottom surface of the recording sheet applies to the recording sheet a conveyance force toward the paper tray 42 from the conveyance path 44 while rotating counterclockwise in FIG. 2.

When only a piece of the recording sheet is sent out from the paper tray 42, the first conveyance roller and the separation roller 45 apply to the recording sheet a conveyance force in a reverse direction to each other in the separation conveyance nip. With this structure, a load exceeding a predetermined threshold is applied to a drive transmission system of the separation roller 45. Then, a torque limiter disposed inside the drive transmission system suspends transmission of the driving force to the separation roller 45 from a DC brushless motor. Then, the separation roller 45 rotates accompanied by the recording sheet conveyed by the first conveyance roller, so that the recording sheet is discharged toward the conveyance path 44 from the separation conveyance nip.

On the other hand, when a plurality of overlapping recording sheets is sent from the paper tray 42, the first conveyance roller applies to the topmost recording sheet a conveyance force toward the conveyance path 44 from the paper tray 42. Then, the topmost recording sheet is sent out from the separation conveyance nip toward the conveyance path 44. On the other hand, the separation roller 45 applies to the recording sheet placed below the topmost sheet a conveyance force toward the paper tray 42 from the conveyance path 44, so that the recording sheet placed below returns to the paper tray 42 from the separation conveyance nip. Then, the topmost recording sheet is separated from other recording sheets and is solely sent out from the separation conveyance nip toward the conveyance path 44.

The recording sheet that has entered the conveyance path 44 further proceeds to the conveyance nip of the conveyance roller pairs 46, and the conveyance force to move from a vertical bottom portion to an upward portion is applied to the recording sheet. With this structure, the recording sheet in the conveyance path 44 is conveyed toward the sheet conveyance path 37 in the image forming unit 1.

The image forming unit 1 as an image forming means includes an optical writing device 2; four image forming units 3K, 3Y, 3M, and 3C each forming a toner image of black (K), yellow (Y), magenta (M), and cyan (C), respectively; a transfer unit 24, and the like. In addition, a sheet conveying unit 28, a registration roller pair 33, a fixing device 34, a switchback unit 36, and the sheet conveyance path 37 are disposed. Light sources such as laser diodes or LEDs disposed inside the optical writing device 2 are driven to emit laser light L toward each surface of drum-shaped four photoconductors 4K, 4Y, 4M, and 4C. Due to this irradiation, an electrostatic latent image is formed on each surface of the photoconductors 4K, 4Y, 4M, and 4C, and the latent image is rendered visible as a toner image via a predetermined development process.

Figure 3:
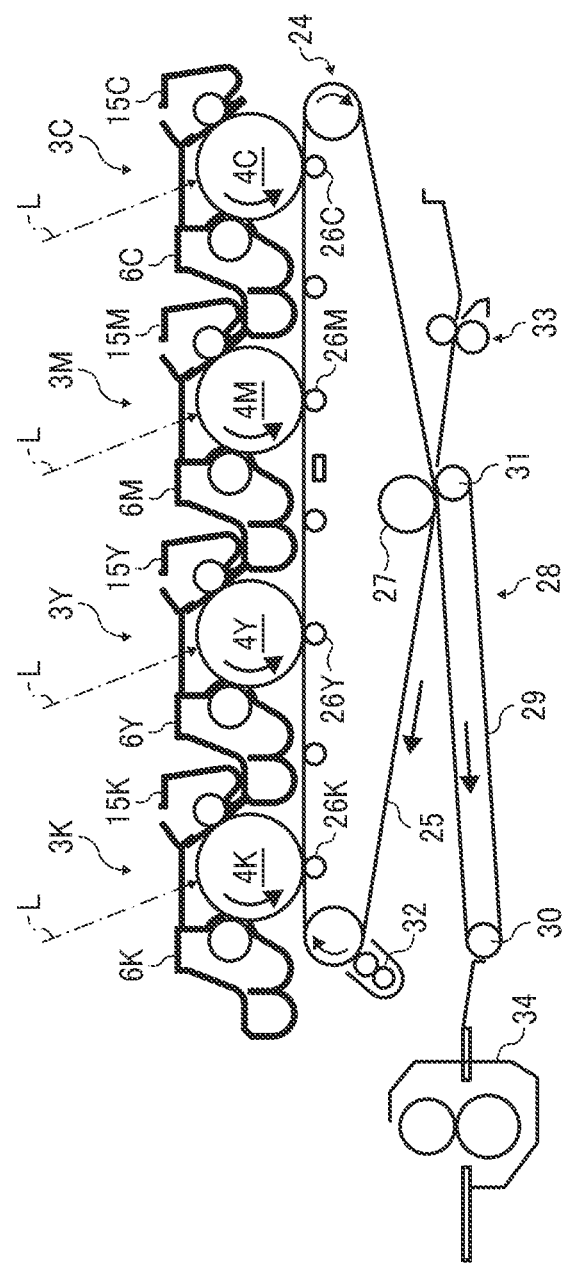
FIG. 3 is an enlarged partial view illustrating an internal structure of the image forming unit in the copier of FIG. 2.
Figure 4:
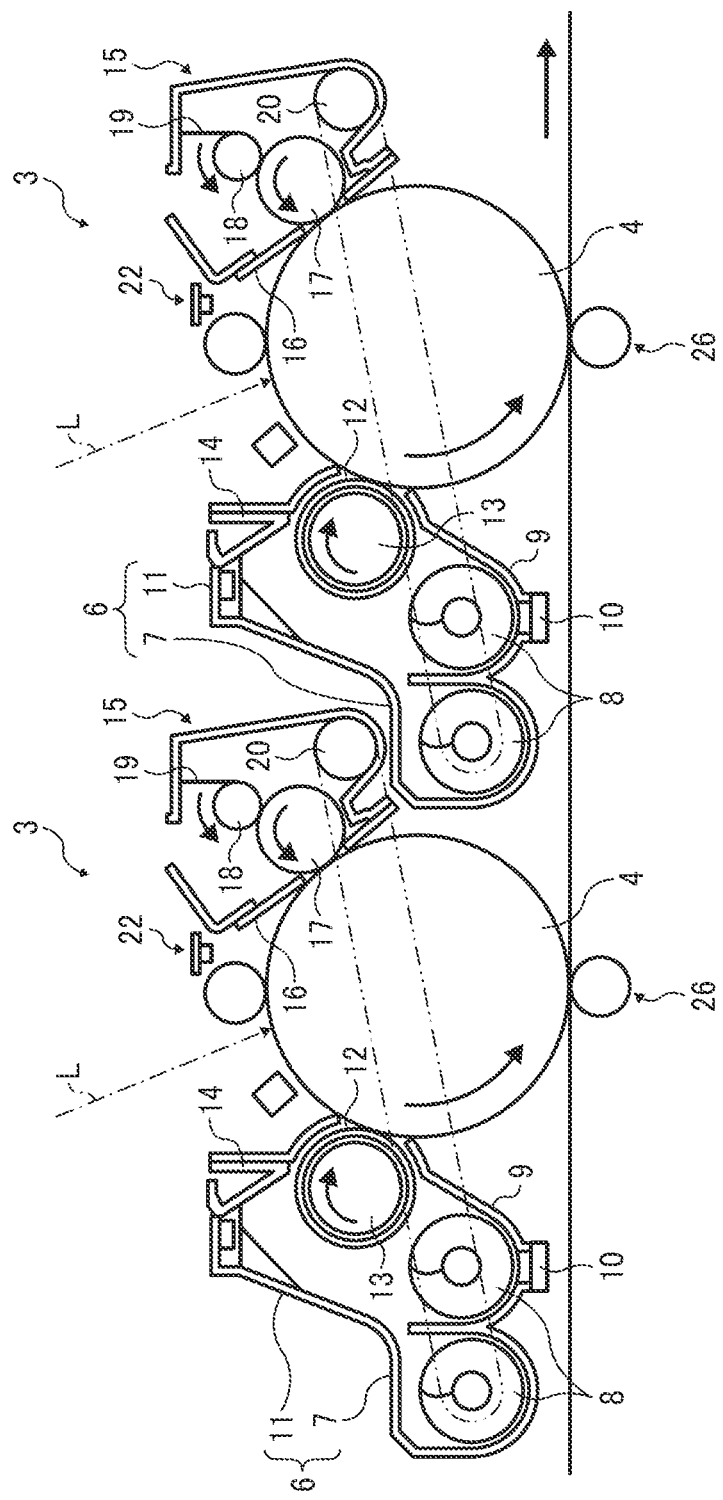
FIG. 4 is an enlarged partial view of a tandem portion formed of four image forming units in the copier.

FIG. 3 is an enlarged partial view illustrating an internal structure of the image forming unit 1. FIG. 4 is an enlarged partial view of a tandem portion formed of four image forming units 3K, 3Y, 3M, and 3C. In addition, the four image forming units 3K, 3Y, 3M, and 3C are configured similarly to each other except that the color of toner in each image forming unit 3K, 3Y, 3M, and 3C processes is different. Therefore, in the description below, suffixes K, Y, M, and C are omitted.

Each of the image forming units 3K, 3Y, 3M, and 3C is formed as a unit including a photoconductor 4 and various parts and components disposed around the photoconductor 4, and each unit thus formed is supported by a common support member and is detachably attachable to a body of the image forming unit 1. As illustrated in FIG. 4, around the photoconductor 4, provided are a charger, a developing device 6, a drum cleaner 15, and a discharging lamp 22. The present copier 100 employs a so-called tandem structure, in which the four image forming units 3 are disposed in serial along a moving direction of an intermediate transfer belt 25, to be described later. The photoconductor 4 is drum-shaped and employs a base tube formed of aluminum and coated with an organic photosensitizing agent. Alternatively, an endless belt-shaped photoconductor may be used.

The developing device 6 develops the latent image with two-component developer including magnetic carrier particles and non-magnetic toner. The developing device 6 includes an agitator 7 and a developer 11. The agitator 7 conveys the two-component developer, while agitating it, to a development sleeve 12; and the developer 11 transfers the toner contained in the two-component developer carried on the development sleeve 12 to the photoconductor 4.

The agitator 7 is disposed at a lower position than the developer 11, and includes two conveyance screws 8 disposed in parallel to each other, a partition disposed between the two conveyance screws 8, and a toner density sensor 10 disposed at a bottom of the developer case 9.

The developer 11 includes the development sleeve 12 disposed opposite the photoconductor 4 through an opening of the developer case 9, a magnet roller 13 disposed not-rotatably inside the development sleeve 12, and a doctor blade 14 a leading end of which is configured to approach the development sleeve 12. The development sleeve 12 has a nonmagnetic and rotatable cylindrical shape. The magnet roller 13 includes a plurality of magnetic poles disposed from a position opposite the doctor blade 14 sequentially to a rotary direction of the development sleeve 12. Magnetic force from these magnetic poles acts on the two-component developer carried on the sleeve at a predetermined position in the rotary direction. With this, the two-component developer sent from the agitator 7 is attracted to the surface of the development sleeve 12 and is carried thereon, and a magnetic brush along the magnetic line is formed on the sleeve surface.

The magnetic brush is regulated to a proper height when passing through the position opposite the doctor blade 14 with rotation of the development sleeve 12, and the magnetic brush is conveyed to a development area opposed to the photoconductor 4. Due to the difference in electric potential between the developing bias applied to the development sleeve 12 and the electrostatic latent image carried on the photoconductor 4, the toner is transferred onto the electrostatic latent image, to thus contribute to the development. Further, the two-component developer returns again to the developer 11 following the rotation of the development sleeve 12, is separated from the sleeve surface due to magnetic repulsion formed among magnetic poles of the magnet roller 13, and is conveyed back into the agitator 7. An appropriate amount of toner is supplied to the two-component developer inside the agitator 7 based on a detection result obtained by the toner density sensor 10. In place of the two-component developer, the developing device 6 may employ one-component developer without including magnetic carrier particles.

The drum cleaner 15 employs a cleaning blade 16 formed of an elastic member that cleans the surface of the photoconductor 4 by contacting it with pressure. However, any other type of cleaning blade may be used. In order to improve cleaning performance, the exemplary embodiment employs a conductive fur brush 17 that contacts a peripheral surface of the photoconductor 4 while rotating in an arrow direction in FIG. 4. The fur brush 17 scrapes a lubricant off from a solid lubricant and, making the lubricant into fine particles, coats the lubricant on the surface of the photoconductor 4. A metallic electric field roller 18 that applies bias to the fur brush 17 is so disposed as to rotate in an arrow direction in FIG. 4, and a leading end of a scraper 19 is pressed to the electric field roller 18. The toner adhered to the fur brush 17 is transferred to the electric field roller 18 that contacts the fur brush 17 while rotating in the counter direction relative to the fur brush 17. The toner scraped from the electric field roller 18 by the scraper 19 drops onto a collection screw 20. The collection screw 20 conveys the collected toner to an end of the drum cleaner 15 in a proximal direction perpendicular to the sheet surface of FIG. 4, and finally delivers to an outside recycle conveyance device 21. The recycle conveyance device 21 sends the delivered toner to the developing device 6 for recycled use.

The discharging lamp 22 electrically discharges the surface of the photoconductor 4 by light exposure. The discharged surface of the photoconductor 4 is uniformly charged by the charger and is optically written by the optical writing device 2. The charger is formed of a charging roller to which charging bias is applied. The charging roller rotates while contacting the surface of the photoconductor 4. Alternatively, a scorotron charger that charges the surface of photoconductor 4 without contacting thereto, may be used.

In FIG. 3, each K-, Y-, M-, and C-toner image is formed on each of the four photoconductors 4K, 4Y, 4M, and 4C of the four image forming units 3K, 3Y, 3M, and 3C, respectively.

The transfer unit 24 is disposed below the four image forming units 3K, 3Y, 3M, and 3C. The transfer unit 24 as a belt driving device includes the intermediate transfer belt 25, stretched around a plurality of rollers, which endlessly moves in the clockwise direction while contacting the photoconductors 4K, 4Y, 4M, and 4C. With this structure, a primary transfer nip for K-, Y-, M-, and C-color is formed at each portion where the photoconductors 4K, 4Y, 4M, and 4C contact the intermediate transfer belt 25, an endless belt member, respectively. Primary transfer rollers 26K, 26Y, 26M, and 26C are disposed on an interior loop of the intermediate transfer belt 25. The intermediate transfer belt 25 is pressed by the primary transfer rollers 26K, 26Y, 26M, and 26C near the primary transfer nip for K, Y, M, and C, against the photoconductors 4K, 4Y, 4M, and 4C. These primary transfer rollers 26K, 26Y, 26M, and 26C each are applied with a primary transfer bias from a power supply. Then, a primary transfer electric field to electrostatically move the toner image on the photoconductors 4K, 4Y, 4M, and 4C onto the intermediate transfer belt 25 is formed at each primary transfer nip for K-, Y-, M-, and C-color. Each toner image is sequentially superimposed at each primary transfer nip on the outer surface of the intermediate transfer belt 25 moving endlessly in the clockwise direction in FIG. 3 sequentially passing through the primary transfer nip for K-, Y-, M-, and C-color. With the superimposing primary transfer, a four-color toner image is formed on the outer surface of the intermediate transfer belt 25.

The sheet conveying unit 28 is disposed below the transfer unit 24. The sheet conveying unit 28 includes an endless sheet conveying belt 29 laid over a drive roller 30 and a secondary transfer roller 31, and allows the sheet conveying belt 29 to move endlessly. The transfer unit 24 includes a tension roller 27 that contacts an inner surface of the intermediate transfer belt 25, so that the intermediate transfer belt 25 and the sheet conveying belt 29 are sandwiched between the secondary transfer roller 31 of the sheet conveying unit 28 and the tension roller 27 of the transfer unit 24. With this structure, a secondary transfer nip is formed at the portion where the outer surface of the intermediate transfer belt 16 contacts the outer surface of the secondary transfer roller 31. The secondary transfer roller 31 is supplied with a secondary transfer bias from a power supply. On the other hand, the tension roller 27 of the transfer unit 24 is grounded. Accordingly, a secondary transfer electric field is formed at the secondary transfer nip.

As illustrated in FIG. 3, a registration roller pair 33 is disposed on the right of the secondary transfer nip. A registration sensor is disposed in the vicinity of an inlet to a registration nip formed between the registration roller pair 32. The recording sheet sent to the registration roller pair 33 is stopped temporarily when a predetermined time has elapsed after the registration sensor detects a leading end of the recording sheet, and contacts the registration nip of the registration roller pair 33.

When the leading end of the recording sheet contacts the registration nip, the registration roller pair 33 resumes rotary driving and sends the recording sheet to the secondary transfer nip when the recording sheet is synchronized with the four-color toner image on the intermediate transfer belt 25. At the secondary transfer nip, the four-color superimposed toner image on the intermediate transfer belt 25 is transferred en bloc onto the recording sheet due to effects of secondary transfer electric field and nip pressure, so that a full-color toner image is formed on the recording sheet with added performance of white color of the recording sheet. The sheet that has passed through the secondary transfer nip is separated from the surface of the intermediate transfer belt 25 and is conveyed while being held on the outer surface of the endlessly moving sheet conveying belt 29, to a fixing device 34.

Residual toner not transferred to the recording sheet that has passed through the secondary transfer nip remains on the surface of the intermediate transfer belt 25. The residual toner remaining on the intermediate transfer belt 25 is scraped off and removed therefrom by a belt cleaner.

The fixing device 34 fixes the full-color image onto the recording sheet with heat and pressure, and the recording sheet on which the full-color image is fixed is conveyed from the fixing device 34 to a sheet discharge roller pair 35, and is discharged outside the copier body.

As illustrated in FIG. 2, the copier includes a switchback unit 36 disposed below the sheet conveying unit 28 and the fixing device 34. With this structure, the recording sheet including one image-fixed side is switched a conveyance direction to the recording sheet reversing unit by a switching claw, is reversed, and is again introduced to the secondary transfer nip. Thereafter, images are formed on the other side surface of the recording sheet via the secondary transfer process and the fixing process, and the recording sheet is discharged on the sheet discharge tray.

The scanner 150 atop the image forming unit 1 includes a movable exposure unit 152 disposed directly below a second contact glass fixed on top of the casing of the scanner 150 so that the second contact glass closely contacts a document MS. The movable exposure unit 152 includes an optical system that includes an LED array as a light source, reflection mirrors, and the like, and can move in the sub-scanning direction, which is the horizontal and lateral direction in FIG. 2. In moving from left to right in FIG. 2, light emitted from the LED array is reflected by the document placed on the second contact glass, the reflected light is reflected by a plurality of reflection mirrors and is introduced to an image reading sensor 153 secured to the scanner body. The movable exposure unit 152 may be disposed directly below a first contact glass fixed on top of the casing of the scanner 150 by moving to a left side more than the illustrated position.

Figure 5:
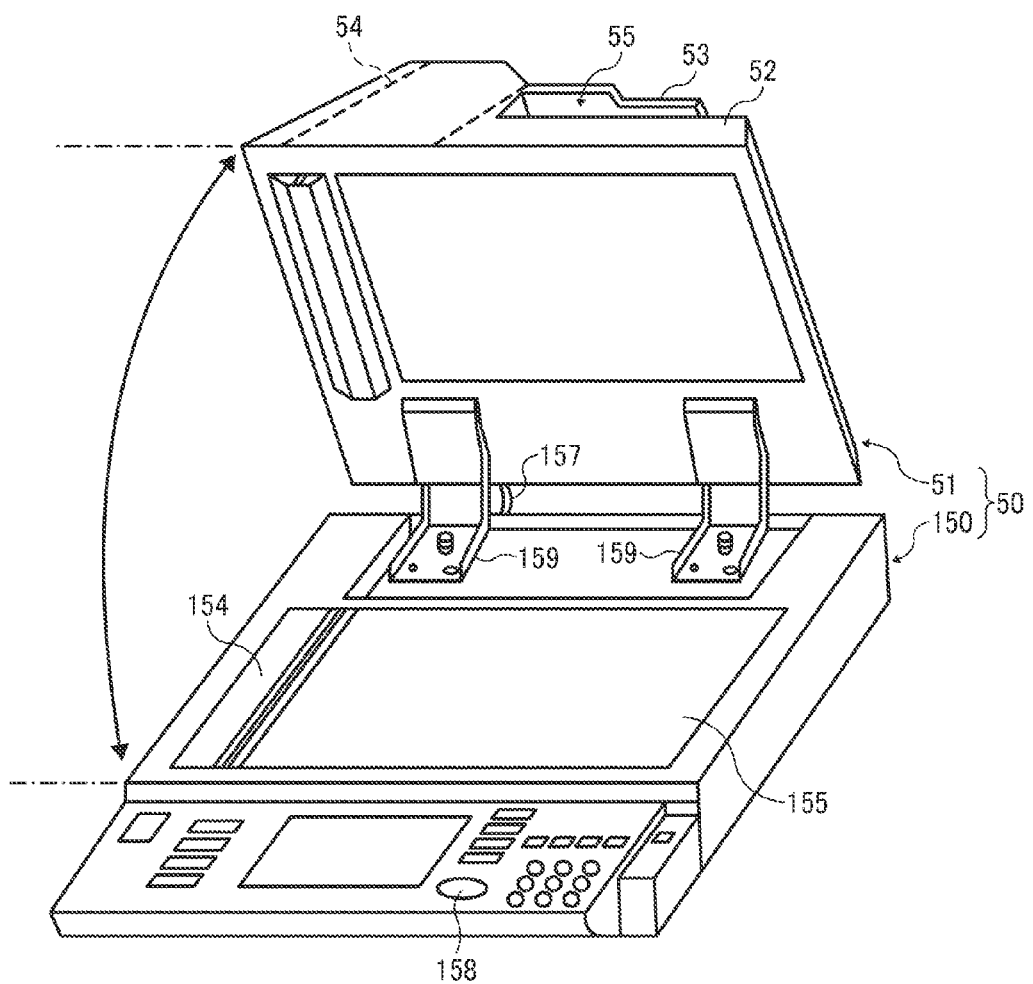
FIG. 5 is a perspective view of an image reader unit of the copier.

The ADF 51 disposed on the scanner 150 includes a body cover 52, and a document loading tray 53 to stack the document MS before being scanned. In addition, the ADF 51 includes a conveyance unit 54 to convey the document MS as a sheet member, and a document stacker 55 on which the document MS after being read is stacked. As illustrated in FIG. 5, the ADF 51 is rotatably supported by hinges 159 fixedly attached to the scanner 150 each serving as a rotary axis. The ADF 51 operates as an openably closable door due to its oscillation and exposes a first contact glass 154 and a second contact glass 155, both disposed on top of the scanner 150. When the document is a bound book, the document cannot be separated into individual pages so that the conveyance by the ADF cannot be done. With the bound document, the ADF 51 is open as illustrated in FIG. 5, and the target pages are placed face down on the second contact glass 155 and the ADF 51 is closed. Then, by pressing a copy start button 158, the copier starts copying operation.

Prior to shipment, a home position of the movable exposure unit 152 of the scanner 150 is set at a position directly below the first contact glass 154, and the movable exposure unit 152 stops at the home position during standby. When the copy start button 158 is pressed, the movable exposure unit 152 starts to move toward a position directly below the second contact glass 155 from the home position. Specifically, the movable exposure unit 152 moves from a left end to a right end of the second contact glass 155 in FIG. 5. In this case, the movable exposure unit 152 allows the light emitted from the LED array to be reflected by the surface of the document MS and directs the reflected light toward the charge-coupled device (CCD) 153. With this operation, the image of the document MS is sequentially read by the CCD 153 from the leading end of the document (that is, from upstream in the sub-scanning direction) to the trailing end in the conveyance direction. The ADF 51 serves to press the document placed on the second contact glass 155 serving as a platen from above downward.

When the document MS includes simply a stacked bundle of sheets each of which is independent of any other, the ADF 51 automatically conveys each sheet of the document MS one by one, and causes the scanner 150 to sequentially read images of the document MS. In this case, a user or operator presses the copy start button 158 after setting the bundle of the document MS on the document loading tray 53. Then, the ADF 51 sends each sheet from a topmost one sequentially from the bundle of sheets placed on the document loading tray 53 to the conveyance unit 54 and further conveys while reversing it to the document stacker 55. In the process of conveying the document, the ADF 2 sends the document MS, while reversing it, to right above the first contact glass 154 of the scanner 150. With this structure, the image on the first side of the document MS is scanned by the movable exposure unit 152 that is stopped at the home position, and is scanned by the CCD 153.

The image reader unit 50 including the ADF 51 and the scanner 150 includes an open/close sensor 157 that includes a rotary encoder, for example, that detects an open/close angle of the ADF 51. Hereinafter, an open or closed angle of the ADF 51 will be described. Zero degree shows a state in which the ADF 51 contacts the second contact glass 155 of the scanner 150 and the second contact glass 155 is completely covered by the ADF 51. Further, when the ADF 51 is open to take an orientation that extends substantially vertically, the open or closed angle of the ADF 51 is 90 degrees.

Figure 6:
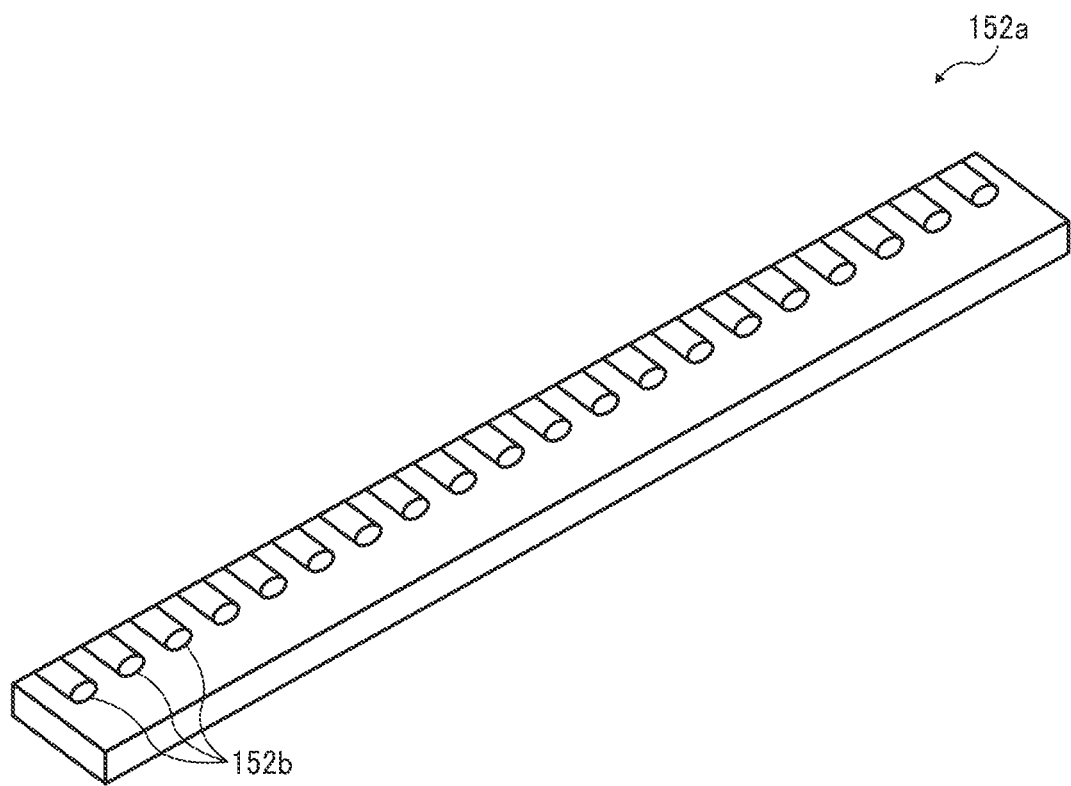
FIG. 6 is a perspective view of an LED array mounted on a movable exposure unit of a scanner of the image reader unit.

FIG. 6 is a perspective view of the LED array 152*a* as a light source mounted on the movable exposure unit 152. As illustrated in FIG. 6, the LED array 152*a* includes a plurality of LED elements 152*b*. These LED elements 152*b* are disposed along the surface of the first contact glass 154 linearly along the main scanning direction perpendicular to the moving direction of the movable exposure unit 152. The scanner 150 reads the image of the document MS with all the LED elements 152*b* of the LED array 152*a* lit, while allowing the movable exposure unit 152 to move from the leading end to the trailing end of the document MS along the sub-scanning direction.

Figure 7:
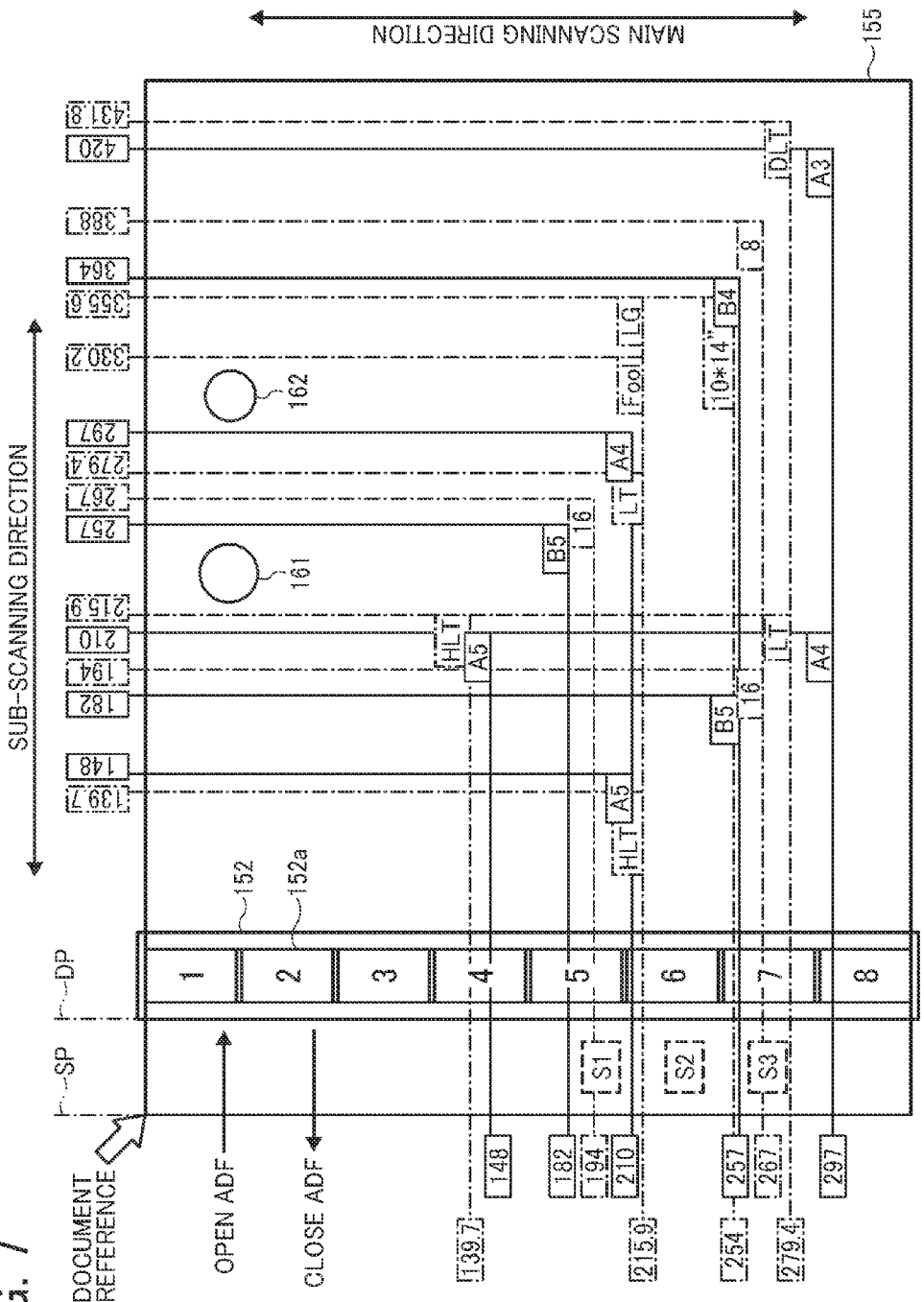
FIG. 7 is a schematic plan view illustrating a position of a document placed on a second contact glass of the scanner, a size of the document, and a lighting pattern of the LED array.

FIG. 7 is a schematic plan view illustrating a position of the document placed on the second contact glass 155, a size of the document, and a lighting pattern of the LED array 152*a*. FIG. 7 illustrates the second contact glass 155 from vertically above. Right below the second contact glass 155, there are provided the movable exposure unit 152, a first sub-scanning size sensor 161, and a second sub-scanning size sensor 162.

In FIG. 7, various texts boxed by solid lines including A5, BLT, B5, second Chinese size, LT, 4A, Foolscap, 10×14", LG, B4, first Chinese size, DLT, and A3 represent sizes of documents. Further, values boxed by broken or solid lines indicate sizes of a longitudinal side or shorter side of the document. The letters S1, S2 and S3 boxed with broken lines indicate corresponding light intensity amount determining area in the main scanning direction in the size detection process.

The second contact glass 155 is disposed with its shorter side along the main scanning direction in the document reading process and with its longitudinal side along the sub-scanning direction. The movable exposure unit 152 is disposed with its longitudinal side along the main scanning direction and is movable in the sub-scanning direction moved by a moving device. Specifically, the movable exposure unit 152 can move reciprocally along the longitudinal direction of the second contact glass 155. When the document MS placed on the second contact glass 155 is scan, the movable exposure unit 152 moves from the left side to the right side in FIG. 7 in the sub-scanning direction. The left side in the sub-scanning direction in FIG. 7 when the document is read is upstream during reading operation. At the same time, the right side in FIG. 7 is downstream during reading operation.

In the copier 100 according to the present embodiment, the leading end position indicated by a solid arrow in FIG. 7 is a reference position of the document. The document reference position is one of four corners in the two-dimensional plane of the second contact glass 155, and this corner exists at an upstream end in the sub-scanning direction during reading operation among all areas in the sub-scanning direction of the second contact glass 155.

Figure 8:
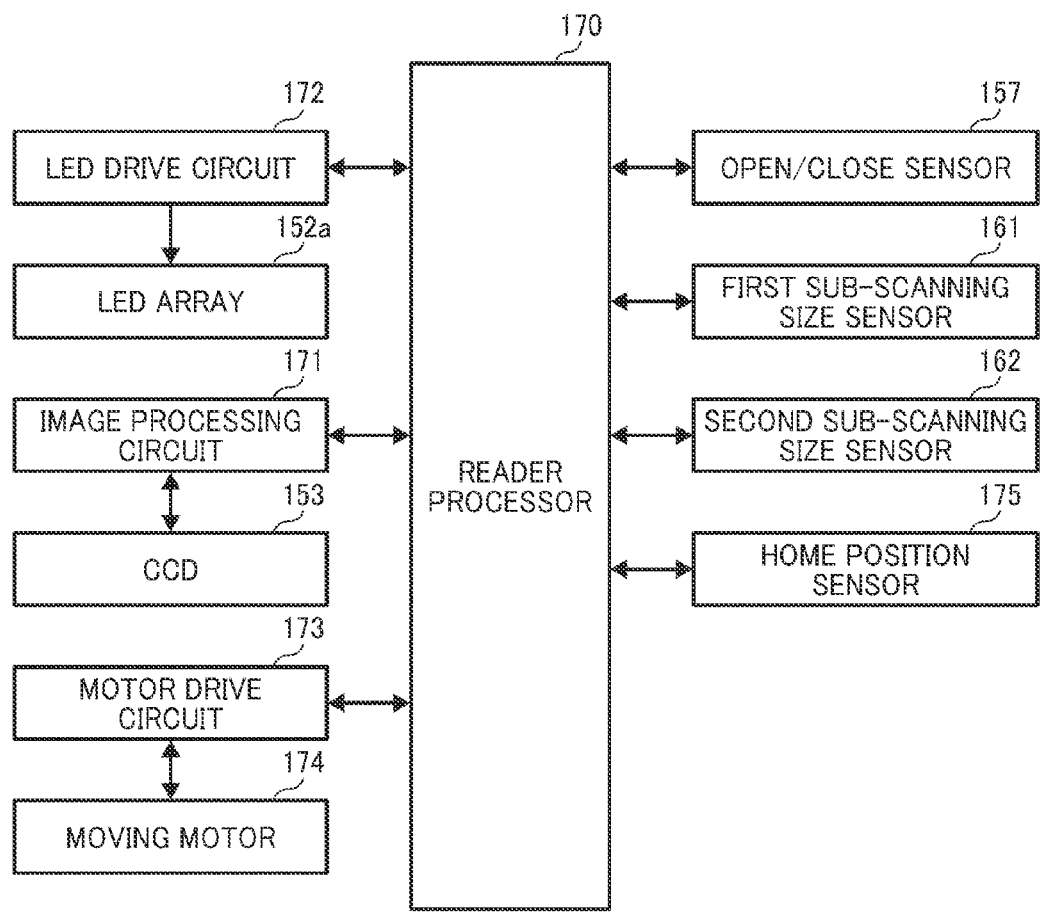
FIG. 8 is a block diagram illustrating a part of circuitry of the scanner of the copier according to an embodiment of the present invention.

FIG. 8 is a block diagram illustrating a part of circuitry of the scanner 150 of the copier according to one embodiment of the present invention. In FIG. 8, a reader processor 170 includes CPUs, RAMs, ROMs, nonvolatile memories, and the like. The reader processor 170 is connected to the open/close sensor 157, the first sub-scanning size sensor 161, the second sub-scanning size sensor 162, an image processing circuit 171, an LED drive circuit 172, a motor drive circuit 173, a home position sensor 175, and the like. The roles and functions of the open/close sensor 157, the LED array 152a, and the CCD 153 are as described heretofore, and further description thereof will be omitted.

The home position sensor 175 is formed of any transmission-type photosensor and the like, detects whether or not the movable exposure unit 152 positions at the home position, and outputs a detection result to the reader processor 170. The LED drive circuit 172 controls activation of the plurality of LED elements 152b of the LED array 152a for each block, to be described later, based on signals from the reader processor 170. The image processing circuit 171 constructs image data of the read image based on the signals from the CCD 153, and outputs, if required, signals from the CCD 153 indicating a received light amount of a predetermined area in the main scanning direction to the reader processor 170. A motor 174 moves the movable exposure unit 152 in the sub-scanning direction and is formed of a stepping motor. Excitation to the motor 174 is controlled by the motor drive circuit 173, but the driving amount and direction of the movable exposure unit 152 is controlled by the reader processor 170.

The movable exposure unit 152 positions at the home position in the reading standby time. Referring to FIG. 7, the home position exists in the left more than the left end of the second contact glass 155 outside FIG. 7. In the standby time, the ADF 51 is completely closed and covers the second contact glass 155. The open angle of the ADF 51 is zero degrees in this state. Accordingly, the user or operator needs to open the ADF 51 in order to place a document on the second contact glass 155. When the operator opens the ADF 51 and upon the open angle of the ADF 51 reaching 30 degrees, the reader processor 170 mounted to the scanner 150 recognizes that the ADF 51 starts operation. Then, based on the recognition, the reader processor 170 moves the movable exposure unit 152 from the home position to a document size detection position DP in FIG. 7. The present embodiment is described with an upstream end of the movable exposure unit 152 in the sub-scanning direction during reading operation set as a positional reference of the movable exposure unit 152 in the sub-scanning direction. As a result, in FIG. 7, a broken line representing the document size detection position DP corresponds to the upstream end of the movable exposure unit 152 during the reading operation.

In the present embodiment, the LED array 152a of the movable exposure unit 152 is split into 8 blocks in the main scanning direction. Then, activation of the plurality of LED elements 152b can be controlled based on each block. Specifically, the LED elements 152b existing in the same block are turned on and off at the same time. Because the LED array 152a is configured as such, each block of the LED array 152a functions as a split light source.

The first sub-scanning size sensor 161 and the second sub-scanning size sensor 162 each are formed of a reflective photosensor. Each sensor 161, 162 emits light toward the second contact glass 155 in a state in which the movable exposure unit 152 positions right below the second contact glass 155. In a state immediately after the ADF 51 is opened, the light emitted from the light emitting element of the first sub-scanning size sensor 161 goes vertically upward via the second contact glass 155. As a result, the first sub-scanning size sensor 161 does not receive the light the own light emitting element emits, as a reflected light. On the other hand, among a whole area on the plane of the second contact glass 155, when the document is placed on the area right above the first sub-scanning size sensor 161, the light emitted from the light emitting element of the first sub-scanning size sensor 161 is reflected by the surface of the document and becomes a reflected light. This reflected light is received by the light receiving element of the first sub-scanning size sensor 161. As described above, the first sub-scanning size sensor 161 receives a light amount exceeding a predetermined threshold by its own light receiving element, that is, detects a presence of the document, when the document exists right above the first sub-scanning size sensor 161. By contrast, when the document does not exist right above the first sub-scanning size sensor 161, the light amount received by its own light receiving element is below the threshold, that is, the document is not detected. Similarly, the second sub-scanning size sensor 162 detects or does not detect the presence of the document in response to the presence or absence of the document disposed right above the second sub-scanning size sensor 162.

As illustrated in FIG. 7, the operator is expected to place the document with its end corner in the sub-scanning direction set at a document reference position on the second contact glass 155. In this case, the document is classified as one of the following three states according to the combination of the size and orientation of the document. In the first state, the downstream end of the document in the sub-scanning direction in reading positions right above the first sub-scanning size sensor 161 and the second sub-scanning size sensor 162. In this state, the first sub-scanning size sensor 161 and the second sub-scanning size sensor 162 both detect the document. In the second state, the downstream end of the document in the sub-scanning direction in reading positions right above the first sub-scanning size sensor 161 alone. In this state, the first sub-scanning size sensor 161 alone detects the document. In the third state, the downstream end of the document in the sub-scanning direction in reading positions right above none of the two sensors. In this state, none of the two sensors detects the document.

The movable exposure unit 152 disposed at the document size detection position DP opposes an upstream end of the document in the sub-scanning direction in reading when the document is placed on the second contact glass 155. Specifically, the document size detection position DP positions to oppose the upstream end in reading of the document placed on the second contact glass 155 relative to the movable exposure unit 152.

After the operator places the document on the second contact glass 155, when starting to close the ADF 51, an open angle of the ADF 51 starts reducing from 90 degrees. Soon, the detection result of the open angle by the open/close sensor 157 reduces to 70 degrees. The reader processor 170 determines that the ADF 51 has started to close when the open angle has reduced to 70 degrees. Based on that determination, the reader processor 170 starts size detection.

The reader processor 170 that has started size detection first determines in which state the first sub-scanning size sensor 161 and the second sub-scanning size sensor 162 are among the above three states. (Hereinafter, the present determination result is referred to a "state determination result.") The reader processor 170 next starts a length identifying process to identify the length of the document in the main scanning direction by selective activation of the LED array 152*a*. In this length identifying process, the LED array 152*a* is partially lit and the length of the document MS in the main scanning direction is identified. As a result, in the length identifying process, light from the LED array 152*a* does not strike the eyes of the operator, thereby reducing uncomfortable feeling of the operator.

As illustrated in FIG. 7, the upstream end in the sub-scanning direction of the second contact glass 155 in reading corresponds to the document reading start position SP of the movable exposure unit 152. Reading of the document MS starts from a state in which the upstream end in the sub-scanning direction of the movable exposure unit 152 in reading positions at the document reading start position SP.

In addition, the reader processor 170 identifies the length of the document MS in the main scanning direction by the length identifying process, and identifies a size of the document MS such as A4-size based on the result of the identified length and the result obtained by the state determination result as described above.

It has been presupposed in the conventional structure that the leading end of the document MS opposed to the movable exposure unit 152 situated at the document size detection position DP is blank; however, there exists a document MS without a leading end blank portion.

For example, suppose that a solid image is formed at a leading end of the document MS and in a first determination area S1 in the main scanning direction. Suppose also that the LED elements 152*b* in the fifth block of the LED array 152*a* oppose to the solid image in the leading end of the document MS. Reflection of the light on the surface of the document of the light emitted from the LED elements is disturbed by the solid image. As a result, the light quantity in the first determination area S1 received by the CCD 153 drastically is reduced compared to a case in which there is no solid image. As a result, it should have been determined that the document MS exists because the received light quantity exceeds the threshold as to the first determination area S1, but instead it is erroneously determined that the document MS does not exist because the received light quantity is below the threshold.

Figure 9:
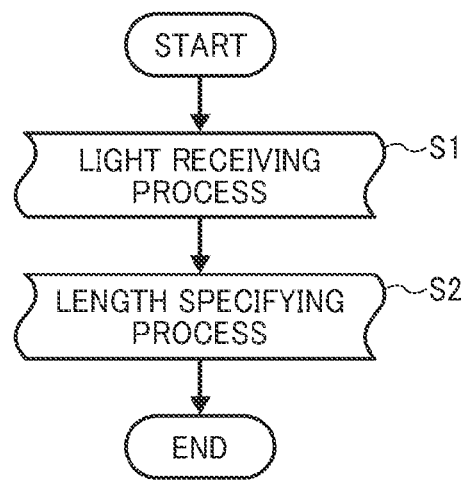
FIG. 9 shows a flowchart illustrating steps in a length identifying process performed by a reader processor.

FIG. 9 shows a flowchart illustrating steps in the length identifying process performed by the reader processor 170. When starting the length identifying process, the reader processor 170 first performs lighting and light-receiving process (Step S1), and the length identifying process (S2).

Figure 10:
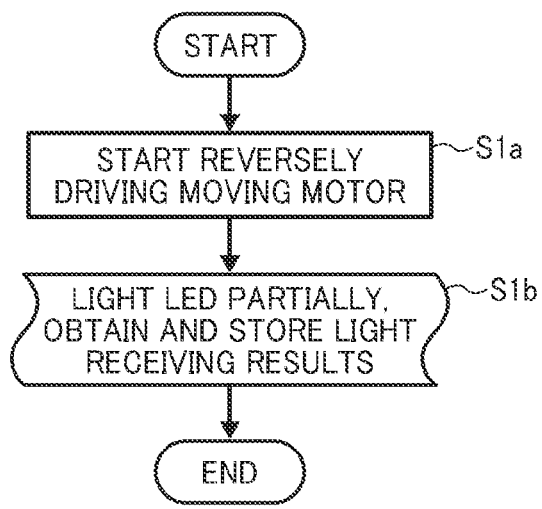
FIG. 10 shows a flowchart of a lighting and light-receiving process in the length identifying process.

FIG. 10 shows a flowchart illustrating details of the processes performed in the lighting and light-receiving process (S1). Upon starting the lighting and light-receiving process, the reader processor 170 first starts to drive the motor 174 reversely (S1*a*) so as to move the movable exposure unit 152 situated at the document size detection position DP toward the document reading start position SP in the sub-scanning direction. Next, the reader processor 170 performs a partial lighting and data obtaining process (S1*b*). In this partial lighting and data obtaining process, among the first to eighth blocks of the LED elements 152*b* in the LED array 152*a*, the LED elements 152*b* corresponding to the blocks necessary to identify the length in the main scanning direction of the document MS are lit simultaneously or at a periodic interval. More specifically, as the blocks necessary for identifying the length, the LED elements 152*b* in the fifth block, the sixth block, and the seventh block corresponding to the first determination area S1, a second determination area S2, and a third determination area S3, respectively, are lit simultaneously or at a periodic interval. While moving the LED elements 152*b* corresponding to the lighting block toward the document reading start position SP, the reader processor 170 allows the CCD 153 to receive the reflected LED beams from the document MS in an area with a certain width in the sub-scanning direction. Respective received light quantity are obtained and stored in a memory such as a RAM.

Figure 11:
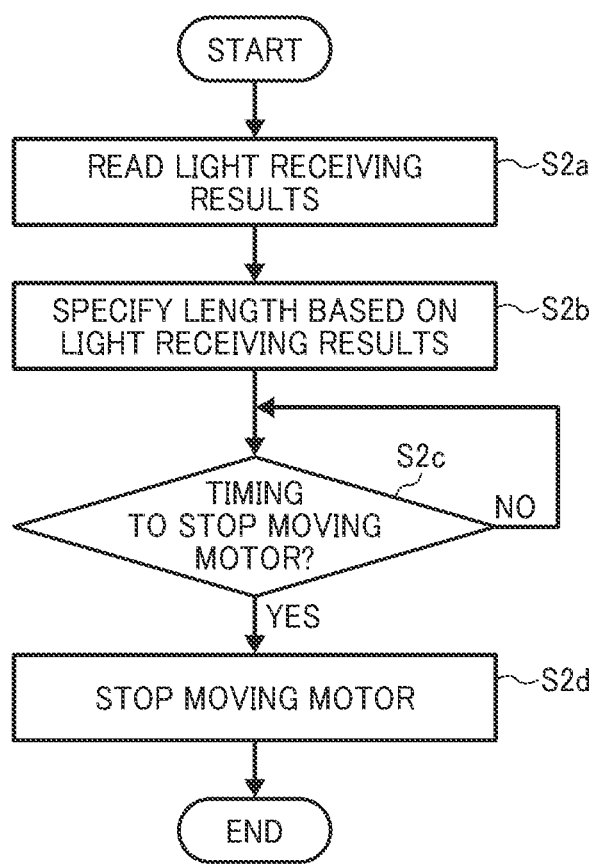
FIG. 11 shows a flowchart of the lighting and light-receiving process in the length identifying process.

FIG. 11 shows a flowchart illustrating details of the processes performed in the length identifying process (S2). Upon starting the length identifying process, the reader processor 170 reads out the received light quantity stored in the memory in the previous process (S2*a*), and identifies the length of the document MS in the main scanning direction based on the received light quantity (S2*b*). Thereafter, whether a stop timing of the motor 174 has come or not is determined (S2*c*). If the stop timing of the motor 174 has come (Yes in S2*c*), the reverse driving of the motor 174 is stopped (S2*d*), and the movable exposure unit 152 is stopped at the document reading start position SP.

As described above, the present copier is configured such that while moving the LED elements 152*b* in the fifth block, the sixth block, and the seventh block necessary for identifying the length of the document toward the document reading start position SP, the result of the light received by the CCD 153 is obtained in the lighting and light-receiving process (S1). In this configuration, when the document MS is present at the lighting LED elements 152*b*, the reader processor 170 allows the CCD 153 to receive the reflected LED beams from the document MS in an area with a certain width in the sub-scanning direction. As illustrated in FIG. 7, the first determination area S1, the second determination area S2, and the third determination area S3 each include an area with a certain width.

Suppose that the document MS placed on the second contact glass 155 includes a solid image at a leading end thereof and the solid image does not extend an entire area of the leading end of the document MS in the sub-scanning direction, but is formed partially in the leading end of the document MS in the sub-scanning direction. Suppose also that the LED elements 152*b* in the fifth block of the LED array 152*a* that positions at the document size detection position DP before starting the length identifying process, oppose to the solid image in the leading end of the document MS. Upon starting the length identifying process, the reader processor 170 causes the movable exposure unit 152 to move toward the document reading start position SP in the sub-scanning direction. As a result, the LED elements 152*b* in the fifth block of the movable exposure unit 152 are away from the opposed position to the solid image and comes to oppose to a blank portion of the leading end of the document MS. Exactly when the LED elements 152*b* in the fifth block oppose the blank portion of the document MS is different depending on the length of the solid image in the sub-scanning direction. If the length of the solid image is relatively short, the LED elements 152b may oppose the blank portion of the document MS before the CCD 153 receives the reflected light beams from the lighting LED elements 152b in the fifth block. In this case, because the CCD 153 receives more light quantity from the first determination area S1 compared to a case in which the document MS does not exist on the LED elements 152b, it is normally determined that the document MS exists. Accordingly, the present copier is configured such that the lighting and light-receiving process (S1) is performed while moving the movable exposure unit 152 toward the document reading start position SP along the sub-scanning direction, thereby preventing erroneous detection of the length of the document MS having a solid image in its leading end thereof.

Another exemplary embodiment (i.e., a first example) of the present invention is described in greater detail below. Unless specified in particular, a schematic structure of the copier according to the first example is identical to the copier as described heretofore.

Concerning the copier according to the first example, the partial lighting and data obtaining process (S1b) as illustrated in FIG. 10 will be described more in detail. Specifically, among all LED elements 152b, the LED elements 152b corresponding to the fifth block, the sixth block, and the seventh block in FIG. 7 alone are lit. Because each block functions as a split light source, the present copier applies a lighting method to light three split light sources at the same time.

The LED elements 152b corresponding to the fifth block capable of obtaining reflected light in the first determination area S1 are used to detect a longitudinal end portion of the A5-size sheet or a short-side end portion of the A4-size sheet. The LED elements 152b corresponding to the sixth block capable of obtaining reflected light in the second determination area S2 are used to detect a longitudinal end portion of the B5-size sheet or a short-side end portion of the B4-size sheet. Further, the LED elements 152b corresponding to the seventh block capable of obtaining reflected light in the third determination area S3 are used to detect a longitudinal end portion of the A4-size sheet or a short-side end portion of the A3-size sheet. Accordingly, three split light sources (the fifth block, the sixth block, and the seventh block) simultaneously lit are disposed opposite each end portion of the regular sized documents different from each other in length.

In the partial lighting and data obtaining process (S1b) in FIG. 10, the reader processor 170 of the present copier causes the LED elements 152b corresponding to the fifth to seventh blocks to light first. The reader processor 170 obtains received light quantity by the CCD 153 as to the first determination area S1 corresponding to the fifth block and stores the obtained result to the memory. At the same time, the reader processor 170 obtains received light quantity by the CCD 153 as to the second determination area S2 corresponding to the sixth block and stores the obtained result to the memory. Further, the reader processor 170 obtains received light quantity by the CCD 153 as to the third determination area S3 corresponding to the seventh block and stores the obtained result to the memory.

Thereafter, in Steps S2a and S2b as illustrated in FIG. 11, the reader processor 170 determines whether or not the length of the document MS in the main scanning direction is equal to or less than 194 mm based on the received light quantity as to the first determination area S1 scan from the memory. Specifically, if the received light quantity as to the first determination area S1 exceeds a predetermined threshold, it is determined that the document MS exists right above the first determination area S1 in the main scanning direction.

Accordingly, it is determined that the size of the document MS in the main scanning direction is not less than 194 mm. Next, a determination of a length based on the received light quantity as to the second determination area S2 is performed. By contrast, if the received light quantity as to the first determination area S1 is less than the threshold, it is determined that the length of the document MS in the main scanning direction is less than 194 mm.

If the length of the document MS in the main scanning direction is not less than 194 mm, the reader processor 170 determines whether or not the length of the document MS in the main scanning direction is less than 240 mm based on the received light quantity as to the second determination area S2 scan from the memory. If it is determined that the length is less than 240 mm, the length of the document MS in the main scanning direction is identified to be less than 240 mm.

If the length of the document MS in the main scanning direction is not less than 240 mm, the reader processor 170 determines whether or not the length of the document MS in the main scanning direction is less than 267 mm based on the received light quantity as to the third determination area S3 scan from the memory. The reader processor 170 identifies the latest determination result as the length of the document in the main scanning direction.

In the present configuration, even when a relatively large document MS with a length of 267 mm or more in the main scanning direction is placed, the partial lighting and obtaining the received light quantity in the partial lighting and data obtaining process (S1b) are performed at one time. Thus, regardless of the size of the document MS, the lighting and light-receiving process (S1) can be performed quickly, thereby effectively preventing erroneous detection of the length, which may tend to occur when the LED light is reflected by a surface of the document pressing surface of the ADF 51.

Conventionally, a document reader performs the length identifying process as follows. Specifically, among the plurality of LED elements included in the LED array, the LED elements corresponding to a predetermined minimum regular size sheet are lit, and the reflected light obtained by the lighting is received by the CCD 153. Then, whether or not the document MS is present at the lit LED elements is determined based on the received light quantity. Then, if the document MS is present at the lit LED elements, the LED elements corresponding to a one-size up regular sheet are lit, and it is determined whether or not the document MS is present at the lit LED elements based on the received light quantity from the lighting. The above lighting of the LED elements and determination of the existence of the document MS are repeated until the existence of the document MS cannot be recognized, so that finally the length of the document MS in the main scanning direction is identified.

In such a structure, when a relatively large document is placed, erroneous detection of the length of the document MS occurs in the length identifying process. Specifically, the length identifying process should be complete from when the open angle of the document cover (or the ADF 51 in the present embodiment) is reduced to 70 degrees until the open angle becomes 30 degrees, that is, within a half-open period. On the other hand, when a relatively large document MS is placed in the length identifying process, following complicated determination processes will be repeated several times. Specifically, the existence of the document MS on the lit LED elements is determined based on the received light quantity obtained by the CCD 153, and whether or not the lighting of the LED elements is switched is determined based on the determination of the existence of the document. When a relatively large document MS is placed, the length identifying process takes relatively a longer time in repeated processes to perform complicated determinations. In such a case, the length identifying process does not complete within the half-open period, and the length identifying process is performed even when the document cover or the ADF 51 is substantially closed. When the ADF 51 is substantially closed, the LED light is reflected by the document pressing surface of the ADF 51 even though the document MS does not exist on the lit LED elements, so that it is determined that the document MS is present at the LED elements, and the erroneous detection of the length of the document MS occurs. In particular, an interrupt processing such as an emergency interrupt process due to an abnormal high temperature occasionally happens to occur during the length identifying process and time allowance is further reduced due to the interrupt processing, thereby resulting in an occurrence of the erroneous detection of the length of the document MS.

By contrast, in the partial lighting and data obtaining process (S1b) as depicted in FIG. 10, the copier according to the second example is configured to perform selective activation of the LED array 152a and obtain received light quantity by the CCD 153 and store the data for each of following three lighting aspects. Specifically, the first lighting aspect is to light the LED elements 152b corresponding to the fifth block in FIG. 7 alone among all the LED elements 152b. The second lighting aspect is to light the LED elements 152b corresponding to the sixth block alone among all the LED elements 152b. The third lighting aspect is to light the LED elements 152b corresponding to the seventh block alone among all the LED elements 152b.

In the partial lighting and data obtaining process S1b, the reader processor 170 allows, among all blocks of the LED array 152a, the LED elements 152b corresponding to the blocks necessary to identify the length of the document MS to be lit at a periodic interval. More specifically, the reader processor 170 obtains received light quantity from the CCD 153 as to the first determination area S1 while lighting the LED array 152a partially in the first lighting aspect. Next, the reader processor 170 obtains received light quantity from the CCD 153 as to the second determination area S2 while lighting the LED array 152a partially in the second lighting aspect. Finally, the reader processor 170 obtains received light quantity from the CCD 153 as to the third determination area S2 while lighting the LED array 152a partially in the third lighting aspect. In the process, such a complicated determination process including determining whether or not the document MS is present at the lighting LED elements 152b depending on the received light quantity, and determining whether the lighting LED elements 152b should be switched or not based on the above result, is not performed.

The reader processor 170 that has completed the partial lighting and data obtaining process S1b identifies a length of the document MS in the main scanning direction similarly to the copier according to the second example, in the length identifying processes S2a and S2b.

Herein, suppose that the ADF 51 is closed to the open angle of below 30 degrees before completion of the length identifying process. Even in this case, if the lighting and light-receiving process S1 is complete when the open angle is reduce to 30 degrees, erroneous detection of the existence of the document on the LED elements 152b due to light reflection by the document pressing surface of the ADF 51 would not occur. Differently from the conventional structure, there is no need of completing all the length identifying process within the half-open period of the ADF 51, and at least the lighting and light-receiving process (S1) is terminated, the erroneous detection of the length due to the light reflection by the document cover of the ADF 51 can be prevented. Further, according to the second example, the lighting and light-receiving process (S1) in which the LED array is partially lit and the received light intensity is obtained and stored in the plurality of lighting aspects necessary for identifying the length of the document MS, does not include the conventional complicated determination processes described above. By contrast, with the present copier according to the second example, the lighting and light-receiving process S1 that takes a drastically small amount of time may only have to be performed within the half-open time period. As a result, when a relatively large size document MS is placed on the second contact glass 155, erroneous detection of the length can be avoided.

Further, the present copier is configured such that, in the partial lighting and data obtaining process S1b, selective activation of the LED array 152a is performed one block at a time. Accordingly, compared to the copier according to the first embodiment in which three blocks are partially lit simultaneously, unpleasant feeling of the user as to glaring light can be reduced. Focusing on the point to prevent erroneous detection of the length when the relatively large size document MS is placed, the movable exposure unit 152 need not be moved in the sub-scanning direction in the partial lighting and data obtaining process S1b. In this case, erroneous detection of the length of the document MS of which leading end portion includes a solid image can be prevented; however, when a relatively large size document MS is placed, the erroneous detection of the length cannot be prevented.

In the LED array 152a, a distance between a hinge 159 as a rotary shaft and the LED elements 152b is nearest as to the fifth block, and second nearest as to the sixth block and farthest from the seventh block. Accordingly, among three blocks, the fifth block is nearest to the hinge 159. In the partial lighting and data obtaining process (S1b) in the lighting and light-receiving process S1, the reader processor 170 changes the lighting aspect from the first lighting aspect relative to the fifth block, to the second lighting aspect relative to the sixth block, and to the third lighting aspect relative to the seventh block. This means that the lighting aspect to light the block is sequentially performed from the block nearer to the hinge 159 among three predetermined lighting aspects.

In the present structure, erroneous detection of the length of the document MS due to reflection of the LED light reflected by the document pressing surface of the ADF 51, can further be prevented. Specifically, when the lighting and light-receiving process S1 is not complete when the open angle of the ADF 51 is reduced to slightly below 30 degrees, the aforementioned erroneous detection may occur. There is a case no erroneous detection occurs, though. Specifically, when the ADF 51 is closing, a distance between the document pressing surface of the ADF 51 and the LED elements 152b becomes greater from the fifth block to the sixth block, and to the seventh block in this order regardless of the open angle. Specifically, as the block is nearer to the hinge 159, the distance between the document pressing surface of the ADF 51 and the LED elements 152b becomes shorter. It means that as the block is nearer to the hinge 159, erroneous detection of the existence of the document MS tends to occur due to the reflection of the LED light reflected by the document pressing surface. The open angle of 30 degrees corresponding to an end point of the half-open time period is a limit that can prevent erroneous detection due to the reflection of the LED light reflected by the document pressing surface of the ADF 51 in the fifth block where erroneous detection tends to occur most. If the open angle becomes 29 degrees and the half-open period has passed, the possibility that the erroneous detection occurs due to the reflection of the LED light reflected by the document pressing surface emerges in the fifth block; however, in the sixth block or the seventh block, the possibility is low. As a result, if the lighting is performed from a block nearer to the hinge 159, even though the length identifying process is not complete within the half-open time period, the erroneous detection of the length of the document MS due to the reflection of the LED light reflected by the document pressing surface is prevented.

In the partial lighting and data obtaining process (S1*b*) as depicted in FIG. 10, the copier according to a third example is configured to perform selective activation of the LED array 152*a* and obtaining received light quantity by the CCD 153 and storing the data for each of following two lighting aspects. Specifically, the first lighting aspect is to light the LED elements 152*b* corresponding to the fifth block and the LED elements 152*b* corresponding to the sixth block in FIG. 7, among all the LED elements 152*b*, which is called a lighting aspect A. In addition, the second lighting aspect is to light the LED elements 152*b* corresponding to the sixth block and the LED elements 152*b* corresponding to the seventh block among all the LED elements 152*b*, which is called a lighting aspect A.

The reader processor 170 obtains the received light quantity from the CCD 153 as to the first determination area S1 and the received light quantity from the CCD 153 as to the second determination area S2 while lighting the LED array 152*a* partially in the lighting aspect A. The reader processor 170 obtains the received light quantity from the CCD 153 as to the second determination area S2 and the received light quantity from the CCD 153 as to the third determination area S3 while lighting the LED array 152*a* partially in the lighting aspect B. In the process, such a complicated determination process including determining whether or not the document MS is present at the lighting LED elements 152*b* depending on the received light quantity, and determining whether the lighting LED elements 152*b* should be switched or not based on the above result, is not performed.

The reader processor 170 that has completed the partial lighting and data obtaining process S1*b* identifies a length of the document MS in the main scanning direction similarly to the copier according to the first example, in the length identifying processes S2*a* and S2*b*. However, because the received light quantity is stored in the lighting aspect A and the lighting aspect B in the second determination area S2, the existence of the document MS is determined based on an average light quantity received. In such a structure, use of an average value may improve the precision in detecting the existence of the document in the second determination area S2.

The copier according to the third example is configured to perform the lighting aspect to light the block sequentially from the block nearer to the hinge 159 among two predetermined lighting aspects.

Figure 12:
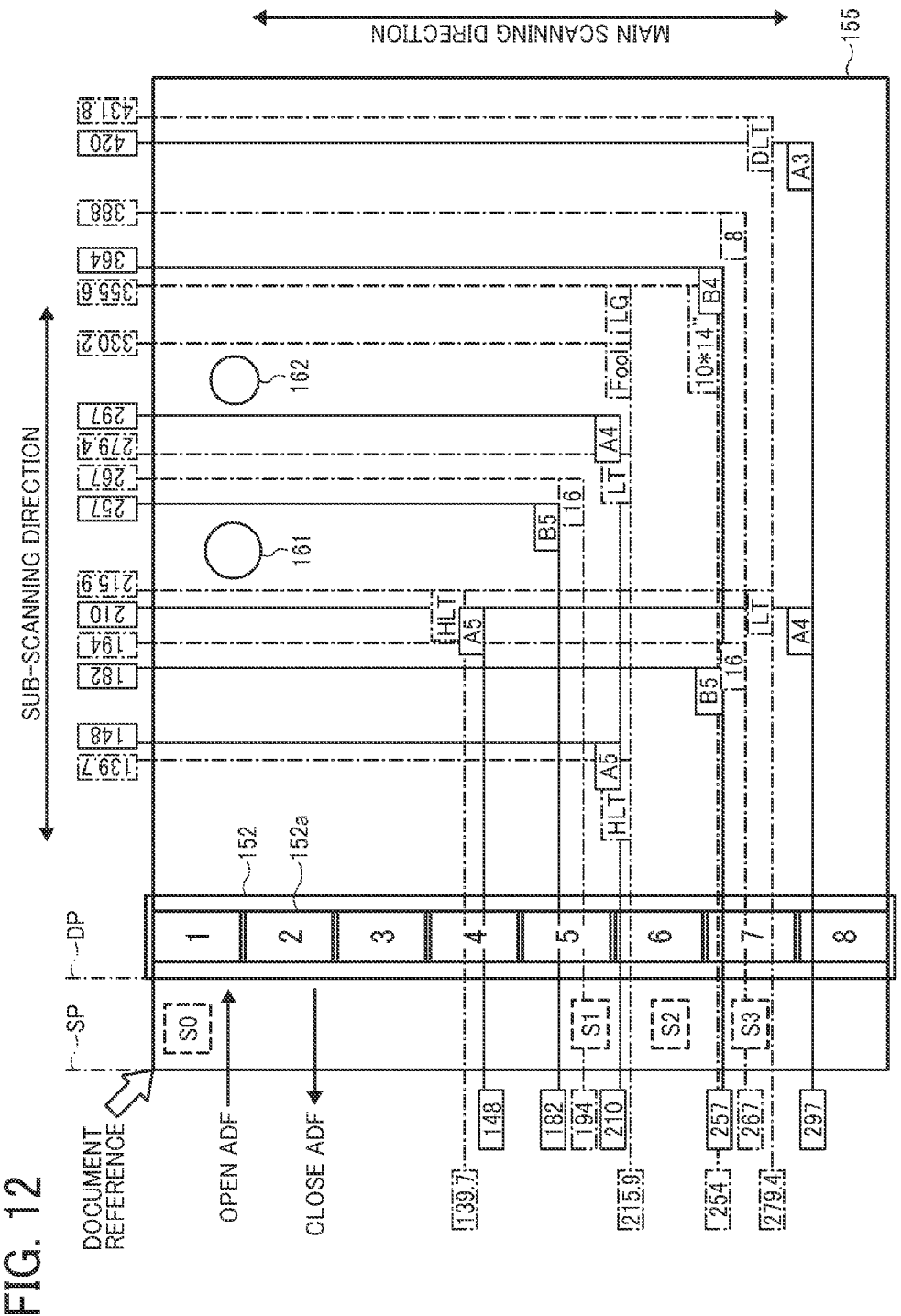
FIG. 12 is a schematic plan view illustrating a position of the document placed on the second contact glass of a scanner of the copier, a size of the document, and a lighting pattern of the LED array according to a fourth example of the present invention.

FIG. 12 is a schematic plan view illustrating a position of the document placed on the second contact glass 155 of a scanner of the copier according to a fourth embodiment of the present invention, a size of the document, and a lighting pattern of the LED array 152*a*. The copier according to the fourth embodiment is different from the copier according to the first example in determining the presence of a document also in a reference determination area S0 in addition to the first to third determination areas S1, S2, and S3. The reference determination area S0 indicated by a bold arrow in FIG. 12 is an area in the vicinity of the document reference position, and even a very small-sized document MS such as a postcard is securely placed thereon. By determining whether or not the document MS exists in the reference determination area S0, the presence of the document MS on the second contact glass 155 can be determined.

In the partial lighting and data obtaining process (S1*b*), the copier according to the fourth embodiment is configured to perform selective activation of the LED array 152*a* and obtaining received light quantity by the CCD 153 and storing the data for each of following two lighting aspects. Specifically, the first lighting aspect is to light the LED elements 152*b* corresponding to a first block and the LED elements 152*b* corresponding to the fifth block in FIG. 12, among all the LED elements 152*b*, which is called a lighting aspect C. In addition, the second lighting aspect is to light the LED elements 152*b* corresponding to the sixth block and the LED elements 152*b* corresponding to the seventh block alone among all the LED elements 152*b*, which is called a lighting aspect B.

The reader processor 170 obtains the received light quantity from the CCD 153 as to the reference determination area S0 and the received light quantity from the CCD 153 as to the first determination area S1 while lighting the LED array 152*a* partially in the lighting aspect C. Next, the reader processor 170 obtains the received light quantity from the CCD 153 as to the second determination area S2 and the received light quantity from the CCD 153 as to the third determination area S3 while lighting the LED array 152*a* partially in the lighting aspect B. In the process, such a complicated determination process including determining whether or not the document MS is present at the lighting LED elements 152*b* depending on the received light quantity, and determining whether the lighting LED elements 152*b* should be switched or not based on the above result, is not performed.

The reader processor 170 that has completed the partial lighting and data obtaining process S1*b* identifies a length of the document MS in the main scanning direction similarly to the copier according to the first example, in the length identifying processes S2*a* and S2*b*. However, the copier according to the fourth embodiment is configured to determine the presence of the document MS based on the received light quantity as to the reference determination area S0, and if the determination result shows that the document MS does not exist, "no document error process" is performed and the length identifying process ends, which is different from the copier according to the first example. The no document error process is a process to cause an LED display to appear an error message such as "THERE IS NO DOCUMENT ON THE CONTACT GLASS."

The copier according to the first example erroneously detects that a length of the document MS in the main scanning direction is 148 mm, when no document MS is placed on the second contact glass 155. By contrast, the copier according to the fourth embodiment can verify the presence of the document MS by determining whether or not the document MS exists in the reference determination area S0, so that the erroneous detection can be avoided.

The copier according to the fourth example is configured to perform the lighting aspect to light the block sequentially from the block nearer to the hinge 159 among two predetermined lighting aspects.

The aforementioned embodiments are examples and specific effects can be obtained for each of the following aspects of (A) to (H):

<Aspect A>

A image reader unit includes: a platen such as a second contact glass 155 to place an document MS; a light source including a plurality of split light sources such as respective blocks of an LED array 152*a* aligned in a main scanning direction along a surface of the platen, and the plurality of split light sources of the LED array 152*a* emitting light beams toward a surface of the document on the platen; a movable exposure unit 152 moving in a sub-scanning direction perpendicular to the main scanning direction while obtaining a reflected light reflected from the surface of the document; an image sensor such as a CCD 153 to scan an image of the document by receiving the reflected light; a control means such as a reader processor 170 to identify a length of the document MS in the main scanning direction based on the received light quantity from the image sensor (CCD 153) obtained by activating fewer than all of the plurality of split light sources. In a length identifying process, the reader processor 170 causes, while moving the movable exposure unit 152 in the sub-scanning direction, only the split light sources necessary for identifying the length of the document MS in the main scanning direction to light simultaneously or at a periodic interval among all the split light sources; in a lighting and light-receiving process, such as a process S1, the reader processor 170 causes the CCD 153 to obtain received light quantity as to a lit split light source, and in the length identifying process, such as a process S2, identifies the length based on each received light quantity.

In such a structure, while moving the split light sources necessary for identifying the size of the document MS in the sub-scanning direction, the reader processor 170 obtains the received light quantity that the image sensor detects. In this configuration, when the document MS is present at the lighting split light source, the reader processor 170 allows the image sensor to receive the reflected LED beams from the document MS in an area with a certain width in the sub-scanning direction. Suppose that the document MS placed on the second contact glass 155 includes a solid image at a leading end thereof and the solid image does not extend an entire area of the leading end of the document MS in the sub-scanning direction, but is formed partially in the leading end of the document MS in the sub-scanning direction. Suppose also that one split light source of the light source that positions opposed to the solid image in the leading end of the document before starting the length identifying process, the length identifying process is started, and the lighting of the split light source and moving of the movable exposure means in the sub-scanning direction is started. As a result, the split light source moving in the sub-scanning direction is away from the opposed position to the solid image and comes to oppose to a blank portion of the leading end of the document MS. If the length of the solid image is relatively short, the split light source opposes the blank portion of the document before the light receiving process of the reflected light beams from the lighting split light source is complete. In this case, because the final light receiving amount becomes more than a case in which the document did not exist on the split light source from an initial state, it becomes possible to normally determine that the document exist, thereby preventing an erroneous detection of the length from occurring. Accordingly, the present copier is configured such that the lighting and light-receiving process is performed while moving the movable exposure unit in the sub-scanning direction, and erroneous detection of the length of the document having a solid image in its leading end thereof is prevented.

<Aspect B>

In the aspect A, the reader processor is configured to perform the lighting and light-receiving process by simultaneously lighting the plurality of split light sources necessary for identifying the length of the document in the main scanning direction, in which the simultaneous lighting of the split light source and obtaining the received light quantity are respectively performed only once. With such a structure, the length of the document in the main scanning direction can be identified by performing partial lighting and obtaining and storing the received light quantity only once.

<Aspect C>

In the aspect B, the plurality of split light sources that is simultaneously lit each corresponds to an end position of the documents with different regular sizes. With this structure, it can be verified presence or absence of the document of the regular size at a position opposed to the lit split light sources.

<Aspect D>

In the aspect A, the reader processor is configured to perform the lighting and light-receiving process, while lighting the plurality of split light sources necessary for identifying the length of the document in the main scanning direction at a periodic interval, sequentially perform acquisition of the received light quantity as to the lighting split light sources.

In such a case, suppose that the length identifying process does not complete within the half-open period, and the length identifying process is performed even when the document cover or the document pressing means is substantially closed. Even in this case, if the lighting and light-receiving process is complete immediately before the half-open period has elapsed, erroneous detection of the length of the document due to light reflection received by a surface of the document pressing means would not occur. Differently from the conventional structure, there is no need of completing all the length identifying process within the half-open period, and at least the lighting and light-receiving process is terminated, the erroneous detection of the length due to the light reflection by the surface of the document pressing means can be prevented. Further, the lighting and light-receiving process in which the light source is partially lit as to the predetermined lighting aspects, does not include following complicated determination processes. Specifically, the existence of the document disposed at a position opposed to the lit split light source is determined based on the received light quantity obtained by the image sensor, and whether or not the lighting of the split light source is switched to another is determined based on the determination of the existence of the document. As a result, when a relatively large size document is placed on the platen, the period taken for the lighting and light-receiving process in the aspect D is drastically reduced compared to the length identifying process of the conventional document reader. In the conventional structure, the length identifying process that takes a long time due to repeated complicated determination processes should be performed within the half-open period. In the present copier according to the aspect D, the lighting and light-receiving process, that takes a drastically smaller amount of time than the length identifying process does, may only have to be performed within the half-open time period. As a result, in the Aspect D, erroneous detection of the length when a relatively large size document is placed can be restricted. In addition, the plurality of split light sources necessary for identifying the size of the document is lit at a periodic interval, a number of lighting of the split light sources at one time can be reduced, thereby further reducing uncomfortable feeling of the user.

<Aspect E>

In the aspect D, a document pressing means such as an ADF 51 to press the document placed on the platen toward the document placement surface is disposed. The ADF 51 is movable about a rotary shaft, such as the hinge 159, and moves between the closed position in which the platen is covered and the open position in which the platen is exposed. Further, an open/close sensor 157 to detect open/close operation of the ADF 51 is disposed. The reader processor 170 is configured to start the length identifying process upon receipt of a detection result of the open/close sensor 157 detecting that the closing operation of the ADF 51. In such a case, the length identifying process does not complete within the half-open period, and the length identifying process is performed even when the document cover or the ADF 51 is substantially closed.

<Aspect F>

In the aspect E, in the lighting and light-receiving process, the reader processor is configured to perform lighting sequentially from the split light source nearer to the rotary shaft among the plurality of split light sources necessary for identifying the length of the document in the main scanning direction. As a result, the lighting is performed to a block nearer to the hinge 159, even though the length identifying process is not complete within the half-open time period, the erroneous detection of the length of the document MS due to the reflection of the LED light reflected by the document pressing surface.

<Aspect G>

An image forming apparatus includes an image reader unit to scan an image of an document such as a scanner 150, and an image forming unit 1 to form an image on a recording member based on the read-out results of the image obtained by the image reader unit, in which the image reader unit described in any of the aspects A to F is employed.

<Aspect H>

A image reader unit comprising: a platen on which to place an document; a light source including a plurality of split light sources such as respective blocks of an LED array 152a aligned in a main scanning direction along a surface of the platen; a movable exposure unit 152 moving in a sub-scanning direction perpendicular to the main scanning direction while obtaining a reflected light reflected from a light emitted from the split light sources of the LED array 152a is irradiated to the document on the platen; an image sensor such as a CCD 153 to scan an image of the document by receiving the reflected light; a control means such as a reader processor 170 to identify a length of the document MS in the main scanning direction based on the received light quantity from the image sensor (CCD 153) obtained by activating fewer than all of the plurality of split light sources, wherein, in a length identifying process, the reader processor 170 allows with moving the movable exposure unit 152 in the sub-scanning direction, only the split light sources necessary for identifying the length of the document MS in the main scanning direction to light simultaneously or at a periodic interval among all the split light sources; in a lighting and light-receiving process, such as a process S1, to obtain received light quantity by the CCD 153 as to a lit split light source, and in the length identifying process, such as a process S2, to identify the length based on each received light quantity.

Additional modifications and variations of the present invention are possible in light of the above teachings. It is therefore to be understood that, within the scope of the appended claims, the invention may be practiced other than as specifically described herein.

What is claimed is:

1. An image reader unit comprising:
   a platen on which a document is placed;
   a light source including a plurality of split light sources aligned in a main scanning direction along a surface of the platen, the plurality of split light sources configured to emit light beams toward a surface of the document on the platen;
   a movable exposure unit configured to move in a sub-scanning direction perpendicular to the main scanning direction while obtaining reflected light reflected from the surface of the document;
   an image sensor configured to scan the document by receiving the reflected light; and
   a reader processor configured to identify a length of the document in the main scanning direction based on a received light quantity from the image sensor obtained by activating fewer than all of the plurality of split light sources, and to,
   perform a lighting and light-receiving process to light simultaneously only split light sources used for identifying the length of the document in the main scanning direction among all of the plurality of split light sources while moving the movable exposure unit in the sub-scanning direction and obtain a received light quantity from the image sensor as to each of the split light sources lit; and identify the length of the document based on the received light quantity.

2. The image reader unit as claimed in claim 1, wherein the reader processor is further configured to:
   perform the simultaneous lighting of the split light sources and obtaining of the reflected light only once.

3. The image reader unit as claimed in claim 2, wherein each of the split light sources simultaneously lit corresponds to an end position of one of documents of different regular sizes.

4. The image reader unit as claimed in claim 1, wherein the reader processor is further configured to:
   obtain the received light quantity as to each of the split light sources.

5. The image reader unit as claimed in claim 4, further comprising:
   a document pressing unit to press the document toward a surface of the platen, movable about a rotary shaft and moving between a closed position in which the platen is covered and an open position in which the platen is exposed; and
   a sensor to detect opening and closing of the document pressing unit,
   wherein the reader processor is configured to start identifying of the length of the document upon receipt of a detection result of the sensor detecting a closing operation of the document pressing unit.

6. The image reader unit as claimed in claim 5, wherein, in the lighting and light-receiving process, the reader processor is further configured to:
   light, from a split light source nearer to the rotary shaft, the split light sources necessary for identifying the length of the document in the main scanning direction.

7. An image forming apparatus comprising:
   an image reader unit as claimed in claim 1 to scan an image of a document; and
   an image forming unit to form an image on a recording member based on read-out results of the image obtained by the image reader unit.

8. An image reader unit comprising:
   a platen on which a document is placed and including a document reference line at an edge of the platen;
   a plurality of split light sources aligned in a main scanning direction along a surface of the platen, the plurality of split light sources configured to emit light beams toward the platen;
   a movable exposure unit configured to move in a sub-scanning direction perpendicular to the main scanning direction while obtaining a reflected light reflected from the surface of the document;

an image sensor configured to receive the reflected light; and a reader processor configured to identify a length of the document in the main scanning direction based on a received light quantity from the image sensor obtained by activating fewer than all of the split light sources, the activated light sources being a plurality of blocks that are each a distance greater than zero millimeters from the document reference line, and perform a lighting and light-receiving process to simultaneously light only split light sources used for identifying the length of the document in the main scanning direction among all of the plurality of split light sources and obtain a received light quantity of the image sensor as to each of the split light sources lit; and identify the length of the document based on the received light quantity.

9. The image reader unit as claimed in claim 8, wherein each of the split light sources simultaneously lit corresponds to an end position of one of documents of different regular sizes.

10. The image reader unit as claimed in claim 8, wherein the reader processor is further configured to:

obtain the received light quantity as to each of the split light sources.

11. The image reader unit as claimed in claim 10, further comprising:

a document pressing unit to press the document toward a surface of the platen, movable about a rotary shaft and moving between a closed position in which the platen is covered and an open position in which the platen is exposed; and a sensor to detect opening and closing of the document pressing unit, wherein the reader processor is configured to start identifying of the length of the document upon receipt of a detection result of the sensor detecting a closing operation of the document pressing unit.

12. The image reader unit as claimed in claim 11, wherein, in the lighting and light-receiving process, the reader processor is further configured to light, from a split light source nearer to the rotary shaft, the split light sources necessary for identifying the length of the document in the main scanning direction.

13. An image forming apparatus comprising:

an image reader unit as claimed in claim 8 to scan an image of a document; and an image forming unit to form an image on a recording member based on read-out results of the image obtained by the image reader unit.

14. An image forming apparatus as recited in claim 8, wherein the split light sources used for identifying the length of the document are the activated light sources.

15. An image forming apparatus as recited in claim 14, wherein the activated light sources are adjacent blocks of light sources.

16. An image forming apparatus as recited in claim 8, wherein the plurality of split light sources aligned in a main scanning direction are arranged as an array of light sources, the array having a first end and a second end.

17. An image forming apparatus as recited in claim 16, wherein the activated light sources are bound by blocks of light sources on the first end and the second end.

18. The image reader unit as claimed in claim 8, wherein the reader processor is further configured to:

perform the simultaneous lighting of the split light sources and obtaining of the reflected light only once.

\* \* \* \* \*